(12) United States Patent
Pan et al.

(10) Patent No.: US 10,560,391 B2
(45) Date of Patent: Feb. 11, 2020

(54) ADAPTIVE ACKNOWLEDGEMENT CONTROL

(71) Applicant: Cisco Technology, Inc., San Jose, CA (US)

(72) Inventors: Rong Pan, Saratoga, CA (US); Parvin Taheri, Mountain View, CA (US); Liyuan Quan, Berkeley, CA (US); Sha Ma, Palo Alto, CA (US); Krishnan Subramani, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 10 days.

(21) Appl. No.: 15/874,491

(22) Filed: Jan. 18, 2018

(65) Prior Publication Data

US 2019/0222528 A1 Jul. 18, 2019

(51) Int. Cl.
*H04L 12/835* (2013.01)
*H04L 12/861* (2013.01)
*H04L 12/825* (2013.01)

(52) U.S. Cl.
CPC ............. *H04L 47/30* (2013.01); *H04L 47/25* (2013.01); *H04L 49/90* (2013.01)

(58) Field of Classification Search
None
See application file for complete search history.

(56) References Cited

U.S. PATENT DOCUMENTS

| | | | |
|---|---|---|---|
| 6,215,769 B1 * | 4/2001 | Ghani | H04L 1/1809 370/230 |
| 7,047,312 B1 | 5/2006 | Aweya et al. | |
| 7,661,112 B2 | 2/2010 | Nemirovsky et al. | |
| 8,170,045 B2 | 5/2012 | Pan et al. | |
| 8,379,515 B1 * | 2/2013 | Mukerji | H04L 47/323 370/229 |
| 8,565,092 B2 | 10/2013 | Arumilli et al. | |
| 8,681,610 B1 | 3/2014 | Mukerji | |
| 9,531,846 B2 | 12/2016 | Han et al. | |
| 9,705,808 B2 | 7/2017 | Arumilli et al. | |
| 2004/0174816 A1 * | 9/2004 | Stewart | H04L 47/10 370/235 |
| 2015/0334596 A1 * | 11/2015 | Szilagyi | H04W 28/0289 370/232 |

* cited by examiner

*Primary Examiner* — Jutai Kao
(74) *Attorney, Agent, or Firm* — Edell, Shapiro & Finnan, LLC

(57) ABSTRACT

A network device is configured to transmit acknowledgement packets according to the length of the egress queue. The network device receives data packets from one or more endpoints and buffers the data packets in an egress buffer before transmitting the data packets. The network device also receives acknowledgement packets that are sent in response to data packets previously transmitted by the network device. The network device buffers the acknowledgement packets in an acknowledgement buffer. The network device transmits the acknowledgement packets at an acknowledgment rate that is based on a queue length of the egress buffer.

20 Claims, 15 Drawing Sheets

US 10,560,391 B2

ADAPTIVE ACKNOWLEDGEMENT CONTROL

TECHNICAL FIELD

The present disclosure relates to traffic control in computer networking.

BACKGROUND

Traffic in data center computer networks has increased and shifted to a largely horizontal (i.e., server-to-server) direction. One aspect of the increased network traffic in data centers is the significant number of microbursts due to server/storage virtualization and distributed computation. These microbursts are also called incasts, and occur when a large number of servers send relatively small transmissions to the same server at the same time. This represents a challenge to the data center network infrastructure (e.g., switches and routers) as the high traffic load mixed with incast bursts may cause instantaneous buffer exhaustion, resulting in retransmissions that lower network throughput and hinder application performance. A larger buffer size may resolve the buffer exhaustion, but presents additional challenges, such as increased latency in potentially latency-sensitive flows (i.e., buffer bloat).

DESCRIPTION OF EXAMPLE EMBODIMENTS

Overview

Figure 1:
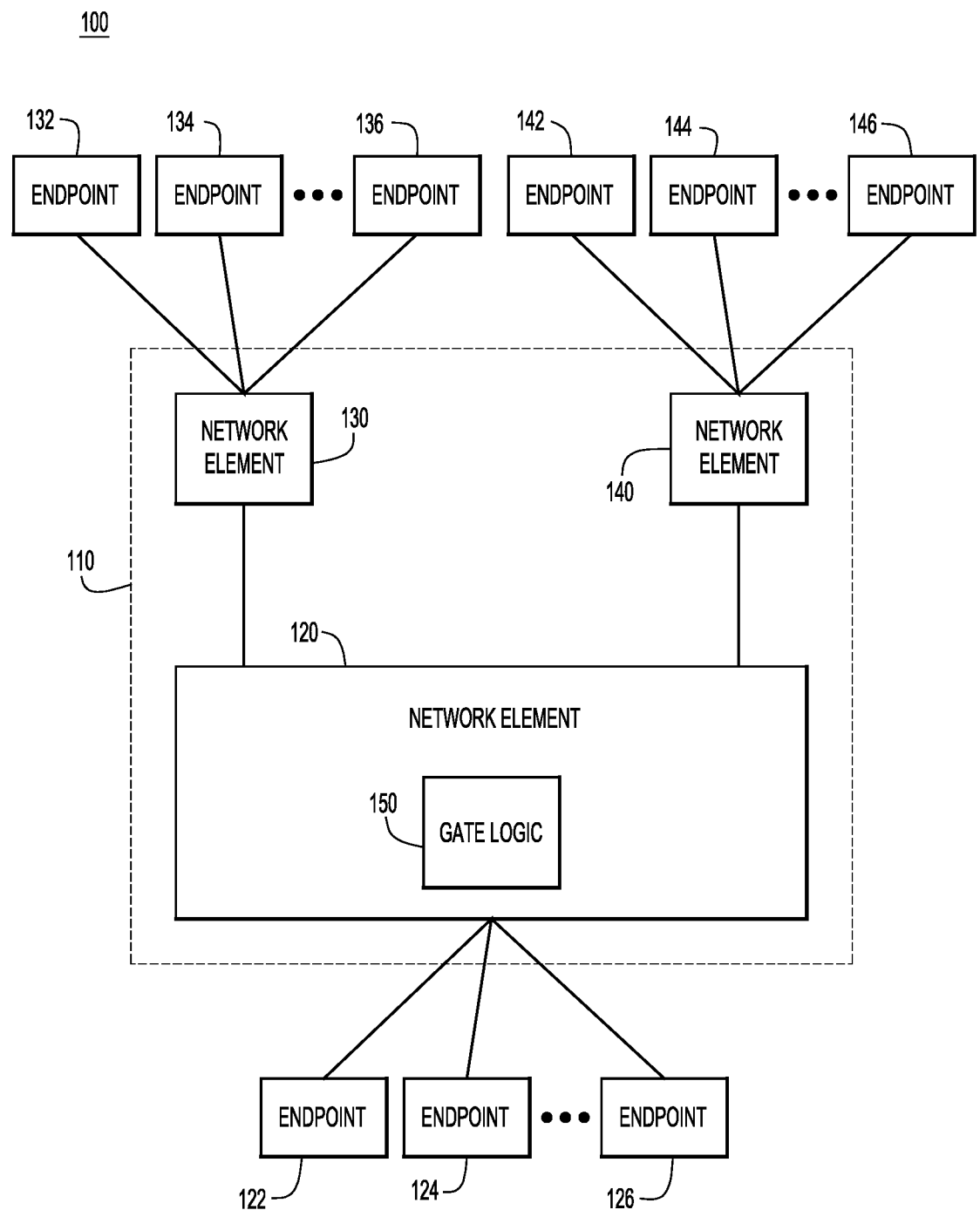
FIG. 1 is a simplified block diagram of a system for controlling traffic flow by buffering acknowledgement messages, according to an example embodiment.

In one embodiment, a method is provided for a network device to transmit acknowledgement packets according to the length of the egress queue. The method comprises receiving a plurality of data packets from one or more endpoints and buffering the plurality of data packets in an egress buffer before transmitting the plurality of data packets. The method also includes receiving a plurality of acknowledgement packets that are sent in response to data packets previously transmitted by the network device. The plurality of acknowledgement packets are buffered in an acknowledgement buffer. The method further includes transmitting the plurality of acknowledgement packets at an acknowledgment rate that is based on a queue length of the egress buffer.

Detailed Description

Sudden bursts of network packets are typically handled by buffers in network elements. With high link speeds, high traffic loads, and heavy incast traffic patterns in data center networks, data center switches would require an exceptionally large buffer. This deep buffer architecture increases switch product costs. Additionally, an extremely large buffer does not necessarily solve the problem in data center network in which the majority of the network traffic is a mixture of long-lived Transport Control Protocol (TCP) flows and incast bursts. Due to the nature of TCP flows, the sources of long-lived flows can continue to send packets at an increasing rate if they do not receive congestion notifications. Data packet buffering in the network blocks or delays the signaling of link congestion, slowing down the built-in TCP congestion feedback to the sources. As a result, long-lived flows may consume a large fraction of the network buffers, leaving little or no buffer room to absorb incast bursts.

According to the techniques presented herein, adaptive acknowledgment message (ACK) control for TCP traffic is used to buffer ACK packets instead of buffering the data packets as a way of handling link congestion at network elements. Since TCP is a reliable transport protocol, ACK messages essentially drive TCP data flows. The TCP sources send more data only when they receive acknowledgement of previously sent data from the receivers. Each TCP ACK packet may bring back one or two data packets. By buffering ACK packets and releasing them at a controlled rate, the network elements essentially control the arrival rate of data packets. By controlling the data arrival rate to be approximately equal to the buffer draining rate, the network element stabilizes the data packet queue at a desired threshold.

The adaptive ACK control mechanism includes data packet queue monitoring, ACK packet queue (in the reverse direction of the data packets), and a controller to adaptively calculate the ACK packet releasing pace based on the data packet queue depth. Two types of queues/buffers are implemented: one queue for data packets and another queue for ACK packets in the reverse direction for the same TCP flows. The data packet queue is used to buffer enough packets to drive 100% link bandwidth utilization. The ACK queue is used to adaptively release ACK packets to control the data packet arrival rate to the data packet queue draining rate.

The network element monitors the data packet buffer, and when the queue length grows beyond a predetermined threshold, the network element begins to buffer the ACK messages in the reverse path. The network element then releases the buffered ACK messages at a controlled pace based on the depth of the data queue. By buffering ACK packets and dynamically pacing their transmission, the network element may control the pace at which TCP flow sources send data packets into the network, or even temporarily stop TCP flow sources from sending more data packets. The network element continues to transmit the data packets from the data queue at full link speed. Once the data arrival rate matches the queue draining rate, the data queue depth will stabilize at a desired threshold during heavy load with incast bursts. Once the data queue is drained to below the predetermined threshold, the network element may discontinue controlling the data arrival rate by discontinuing to buffer the ACK packets.

Referring now to FIG. 1, a data center 100 is shown that is configured to control data traffic across a network 110 by buffering acknowledgement messages. The data center 100 includes a network element 120 connected to a plurality of endpoints 122, 124, and 126, a network element 130 connected to a plurality of endpoints 132, 134, and 136, and a network element 140 connected to a plurality of endpoints 142, 144, and 146. The network 110 comprises the network elements 120, 130, and 140.

In one example, the network elements 120, 130, and 140 may include routers, switches, or other physical or virtual network devices that route traffic throughout the network 110. The network 110 may configure the network elements 120, 130, and 140, as well as other network elements not pictures in a number of topologies (e.g., spine/leaf, ring, star, mesh, etc.). A Guided ACK Transmission Enhancement (GATE) logic 150 in the network element 120 is configured to control the data traffic through the network element 120 by a controlled release of ACK messages. Though not explicitly depicted in FIG. 1, the other network elements 130 and 140 may also include similar GATE logic.

In another example, the endpoints 122, 124, 126, 132, 134, 136, 142, 144, and 146 may be virtual or physical servers or other computing devices. For simplicity, only three endpoints are depicted attached to each network element in FIG. 1. However, any number of endpoints or additional network elements may be attached to each network element. For instance, in a data center environment, hundreds of servers may be attached to a network element.

Figure 2:
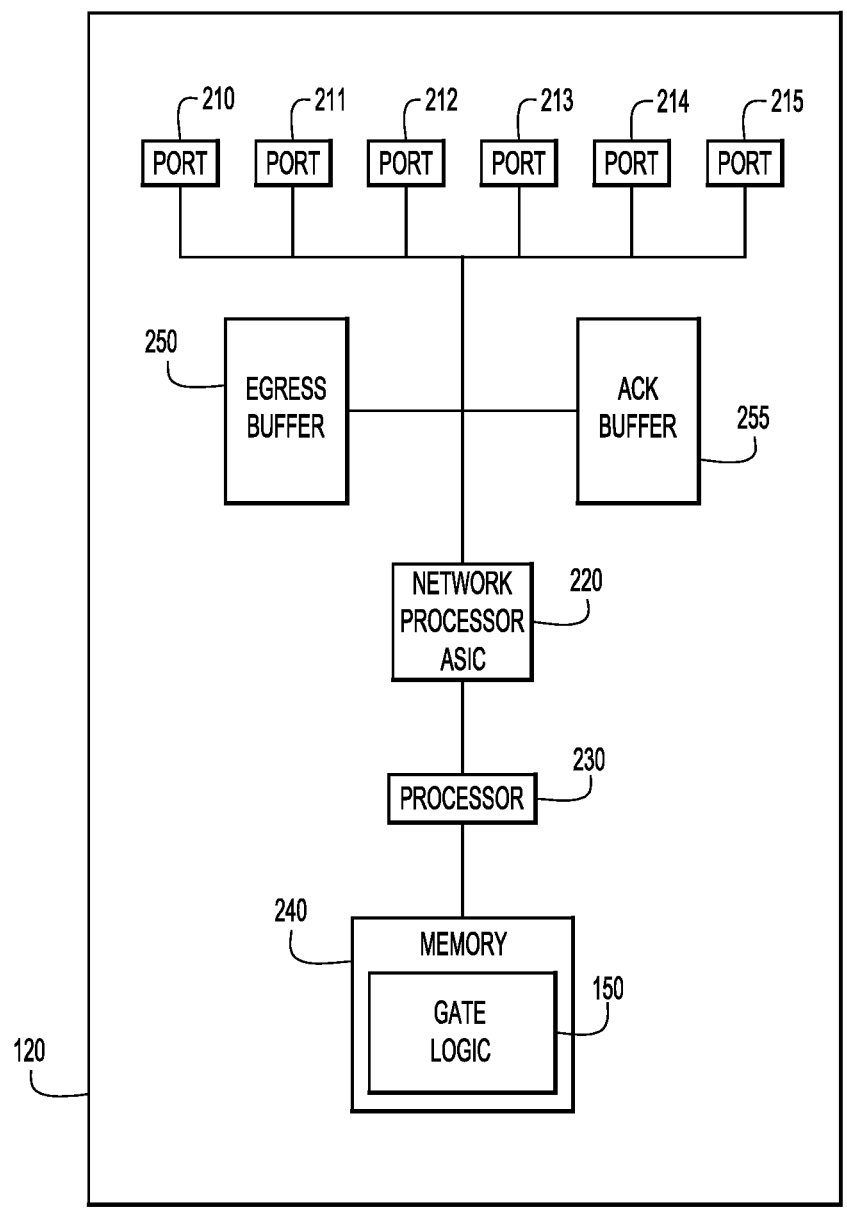
FIG. 2 is a simplified block diagram of a network device configured to buffer acknowledgement messages, according to an example embodiment.

Referring now to FIG. 2, a simplified block diagram illustrates a network device (e.g., network element 120) that is configured to participate in the techniques presented herein. The networking device includes a network interface unit in the form of a plurality of network ports 210-215, a processor Application Specific Integrated Circuit (ASIC) 220 that performs network processing functions, one or more processors 230 (e.g., microprocessors or microcontrollers), and memory 240. Additionally, the network device 120 includes an egress buffer 250 for temporarily storing data packets for later processing and/or transmission. An ACK buffer 255 temporarily stores standalone ACK messages that are received at the network device 120. The network device 120 may include multiple network processor ASICs to perform various network processing functions. The memory 240 stores the GATE logic 150, which may include instructions for storing ACK messages in the ACK buffer 255 in order to control the rate at which data packets are received at the network device 120. It is to be understood that, in certain examples, the network device 120 may be a virtual (software-based) appliance. The processor 230 performs higher level control functions of the network device 120, in concert with functions of the network processor ASIC 220.

The memory 240 may include read only memory (ROM), random access memory (RAM), magnetic disk storage media devices, optical storage media devices, flash memory devices, electrical, optical, or other physical/tangible memory storage devices. Thus, in general, the memory 240 may comprise one or more tangible (non-transitory) computer readable storage media (e.g., a memory device) encoded with software comprising computer executable instructions and when the software is executed (by the one or more processors 230) it is operable to perform the operations described herein. For example, the memory 240 stores instructions for the GATE logic 150 described above. When the processor 230 executes the instructions for the GATE logic 150, the processor 230 is caused to control the network device 120 to perform the operations described herein. As an alternative, the functions of the GATE logic 150 may be performed by the network processor ASIC 220. Additionally, the egress buffer 250 and/or the ACK buffer 255 may be defined from a portion of the memory 240. Alternatively, the egress buffer 250 and/or the ACK buffer 255 may be distinct memory elements separate from the memory 240.

In one example, the egress buffer 250 and the ACK buffer 255 may comprise multiple buffers dedicated to different network traffic. For instance, each port 210-215 may be associated with a separate egress buffer 250 and ACK buffer 255. Additionally, network packets may be buffered in separate egress buffers and ACK buffers according to the class of service of the network traffic.

Figure 3:
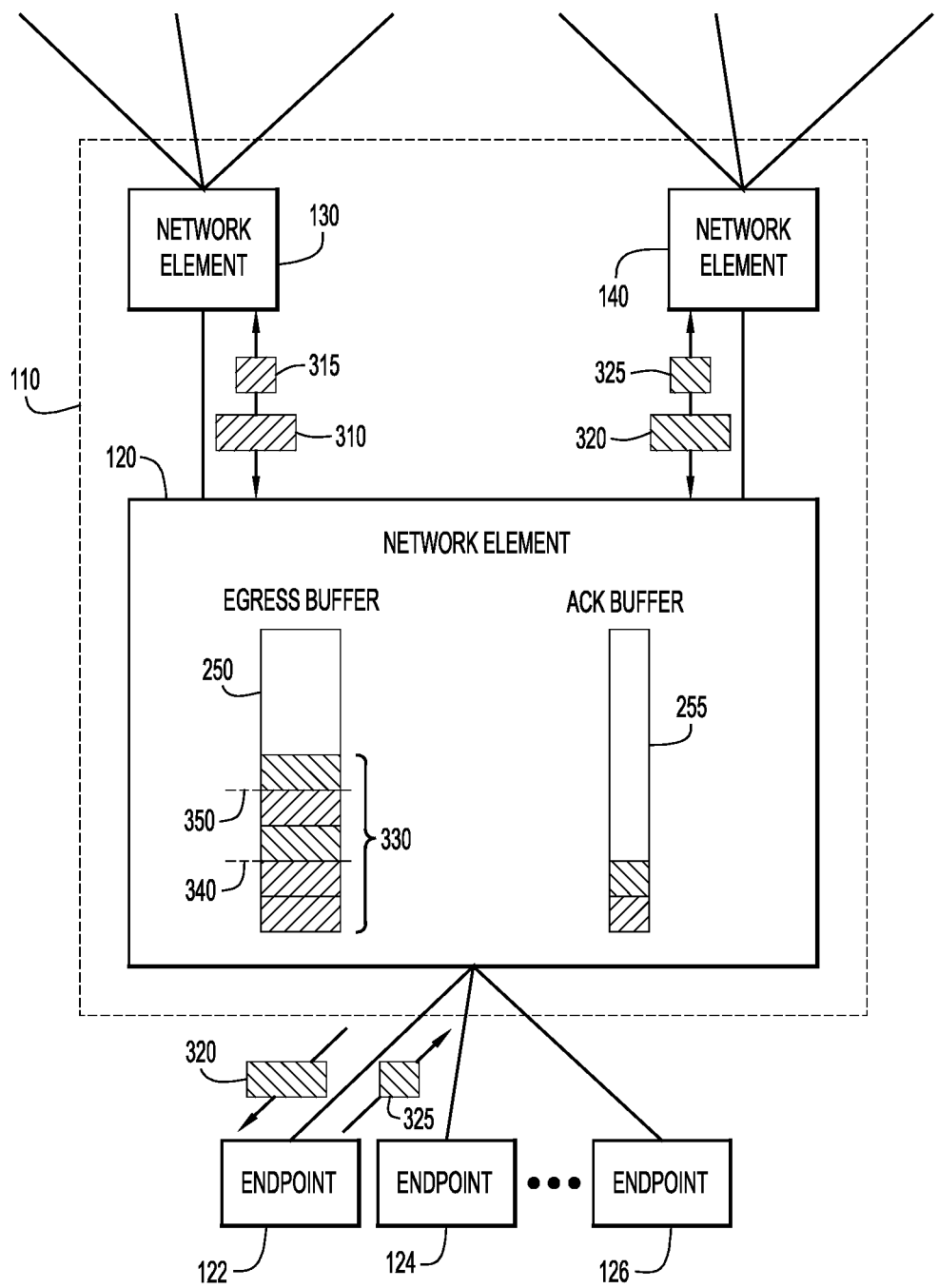
FIG. 3 illustrates handling an incast event at a network element, according to an example embodiment.

Referring now to FIG. 3, a simplified block diagram illustrates how the network element 120 buffers TCP flows to maintain room in the egress buffer 250 for incast events. The network element 120 receives data packets 310 and 320 from the network elements 130 and 140, respectively. The data packets 310 and/or 320 may be data packets from long-lived TCP flows or from incast events. The network element 120 stores each of the data packets 310 and 320 in the egress buffer 250 before sending the packets to their destination endpoint 122. The destination endpoint 122 returns ACK packets 315 and 325 in response to receiving data packets 310 and 320, respectively. The network element 120 forwards the ACK packets 315 and 325 to the network elements 130 and 140, respectively, along the reverse path of the data packets 310 and 320.

As the network element 120 fills the egress buffer 250 with incoming packets 310 and 320, the GATE logic 150 monitors the queue depth 330 of the egress buffer to determine whether to begin buffering ACK packets. Once the queue depth 330 exceeds a predetermined threshold 340, the network element begins to store the returned ACK packets 315 and 325 in the ACK buffer 255. Depending on the queue depth 330 of the egress buffer 250, the network element 120 releases the ACK packets 315, 325 from the ACK buffer 255 at a rate that is designed to move the queue depth toward a desired queue depth 350.

In one example, a Proportional-Integral (PI) controller calculates the number of ACK packets $N_{ACK}$ to be released in a configurable time interval, so that the queue depth 330 is stable at the desired queue depth 350. For instance, the number of ACK packets released per time interval may be adjusted according to:

$$\Delta N_{ACK} = -a \cdot (Q_{cur} - Q_{des}) - b \cdot (Q_{cur} - Q_{old}),$$

where $\Delta N_{ACK}$ is the change in the number of ACK packets $N_{ACK}$ released in a given time interval (i.e., the change in the rate of ACK packets released), a and b are control parameters, $Q_{cur}$ is the current queue depth, $Q_{des}$ is the desired queue depth, $Q_{old}$ is the previous queue depth from the time interval immediately prior to the current time interval. The time interval to update the PI control loop may be programmable. The control parameters a and b are typically tuned to the network conditions, such as the round trip time (RTT). Based on the calculated number of ACK packets $N_{ACK}$ allowed per time interval, the network element 120 may derive an appropriate number of ACK packets to release every packet transmit interval for the ACK queue 255.

For instance, the PI control loop may be updated every t=16 μs. If the GATE logic 150 calculates $N_{ACK}$=120, then the network element will release only those 120 ACK packets in the next 16 μs. The network element may repeatedly release 6 ACK packets every packet transmit interval (e.g., 100 ns) until all 120 ACK packets are transmitted (e.g., for 2 μs). Alternatively, the network element may release a single ACK packet every 100 ns for 12 μs in order to more evenly space the ACK releases.

In a further example, the value of actual number of ACK packets $N_{ACK}$ released in a given time interval may have a minimum of zero and a programmable maximum (e.g., 500 ACK packets every 16 μs). A minimum rate $N_{ACK}$ of zero avoids a tail drop on the egress buffer, in certain scenarios (e.g., bursty UDP traffic). In other words, temporarily blocking ACK releases, and the corresponding TCP flows, may be used to control the egress queue during some network conditions.

In another example, controlling the rate at which ACK packets are released, instead of merely delaying each ACK by an amount based on the egress queue depth, enables the network element to maintain control of the TCP flows in a TCP slow start phase. In the TCP slow start phase, each transmitted ACK packet returns two data packets, and in order to stabilize the egress queue, the rate of releasing ACK packets should be half of the rate of receiving the ACK packets. For instance, if the RTT for the network is 20 μs, then the network element will not see any feedback from controlling the release of ACK packets until 10 μs later. In an incast scenario, the network element may receive 1.5 MB of data (e.g., 1000 servers each sending a single packet) at the egress buffer all at once. The network element will receive ACK packets for that 1.5 MB and transmit those ACK packets at approximately the same time. In response, 20 μs later, the egress buffer will receive 3 MB of data. Merely increasing the delay of the ACK packets changes the exact time that the egress buffer will receive a potentially overwhelming amount of data, but does not change the size of the batch of data that will be received at the same time.

In order to stabilize the egress queue in this TCP slow start phase, the network element paces the release of ACK packets to half of the rate of receiving the ACK packets. Essentially, the network element monotonically increases the delay for each ACK packet. The techniques described herein sets the rate of the releasing the ACK packets based on the queue depth of the egress queue. By controlling the rate of ACK release, the rate of data coming into the egress queue is self-regulating, regardless of the technical capabilities (e.g., link/port speed, latency, etc.) of the network element.

Figure 4A:
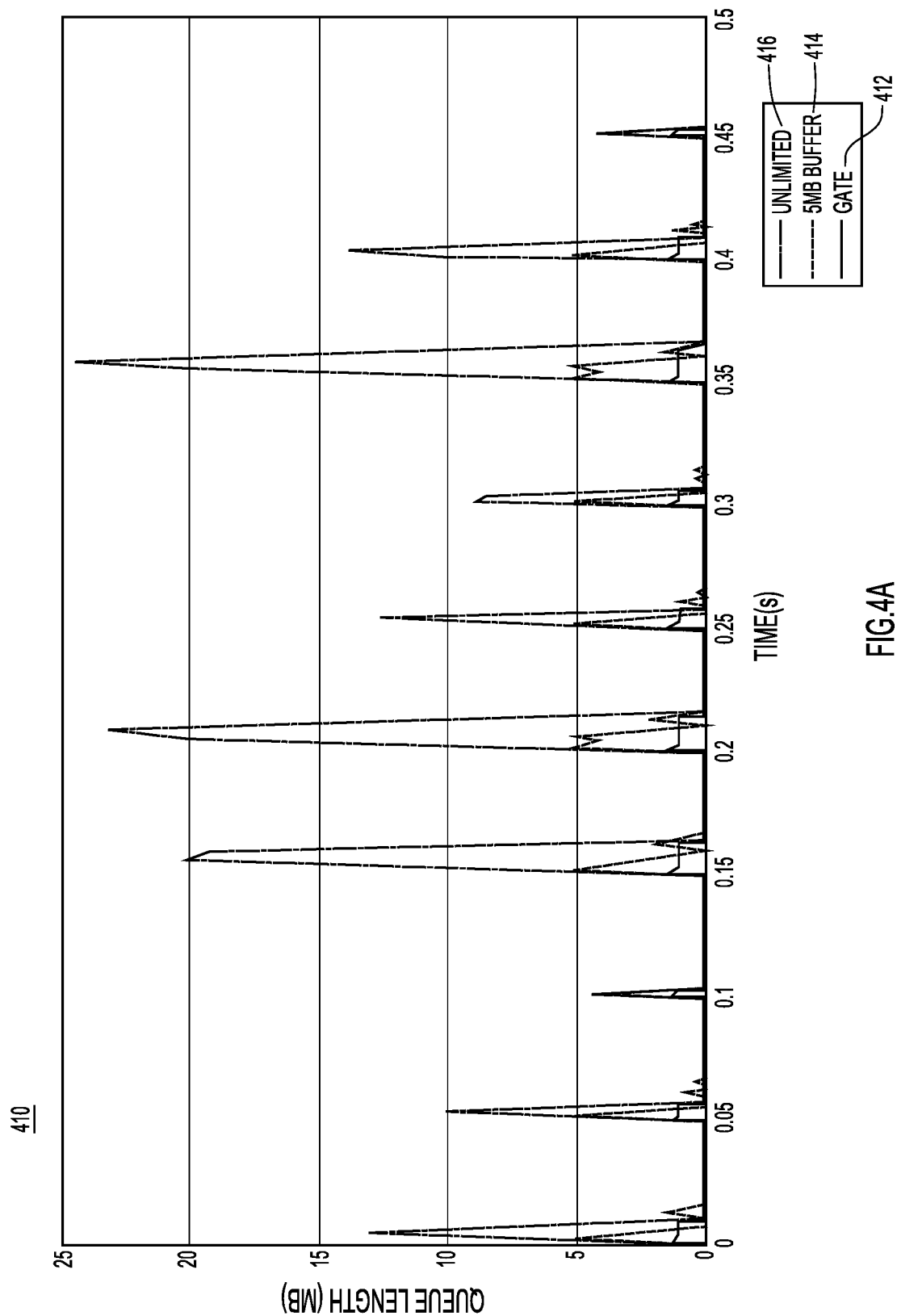
FIG. 4A is a graph of the buffer queue length for data packets in handling a simulated incast event, according to an example embodiment.
Figure 4B:
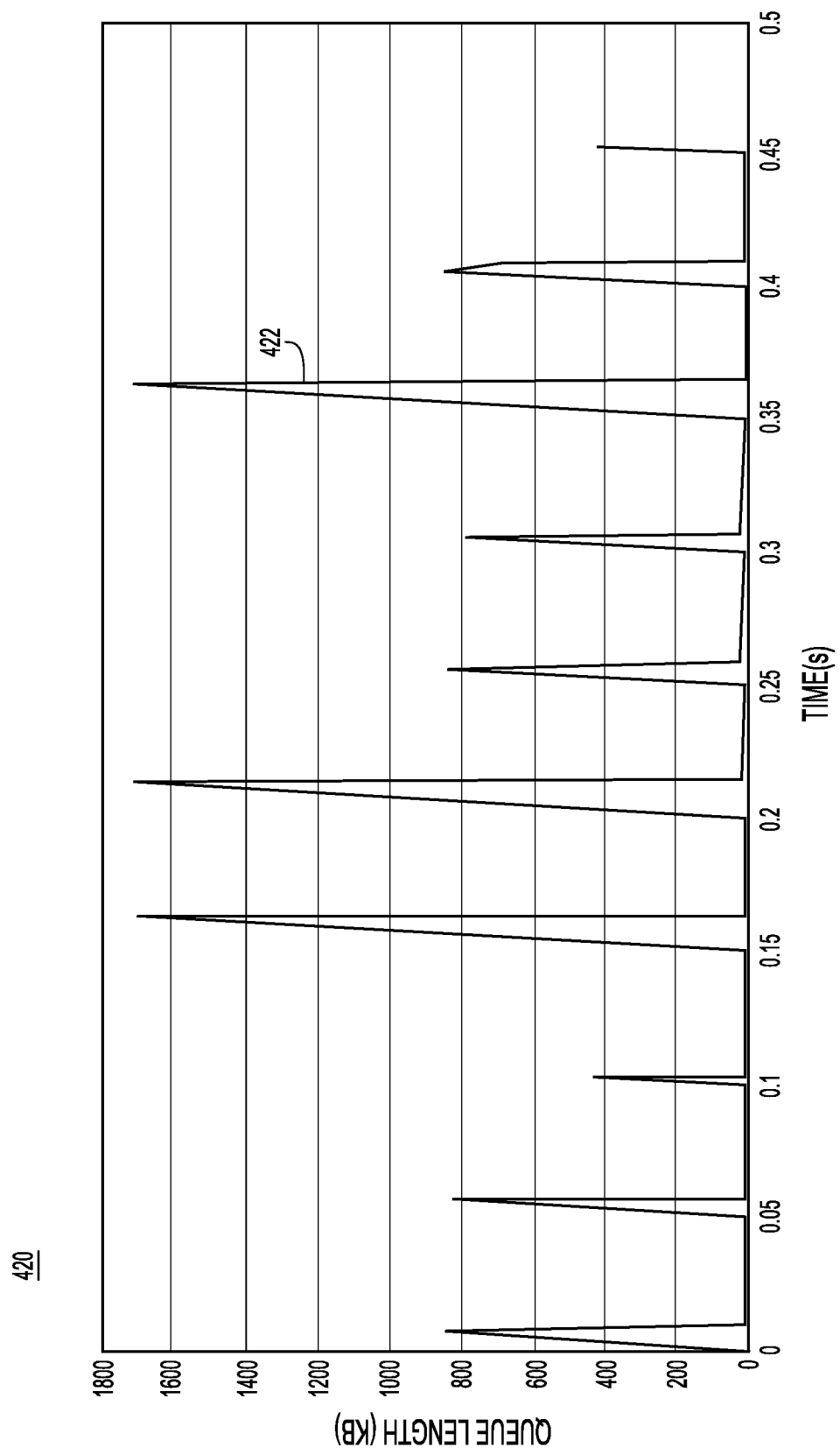
FIG. 4B is a graph of the buffer queue length for acknowledgement packets in handling a simulated incast event, according to an example embodiment.
Figure 4C:
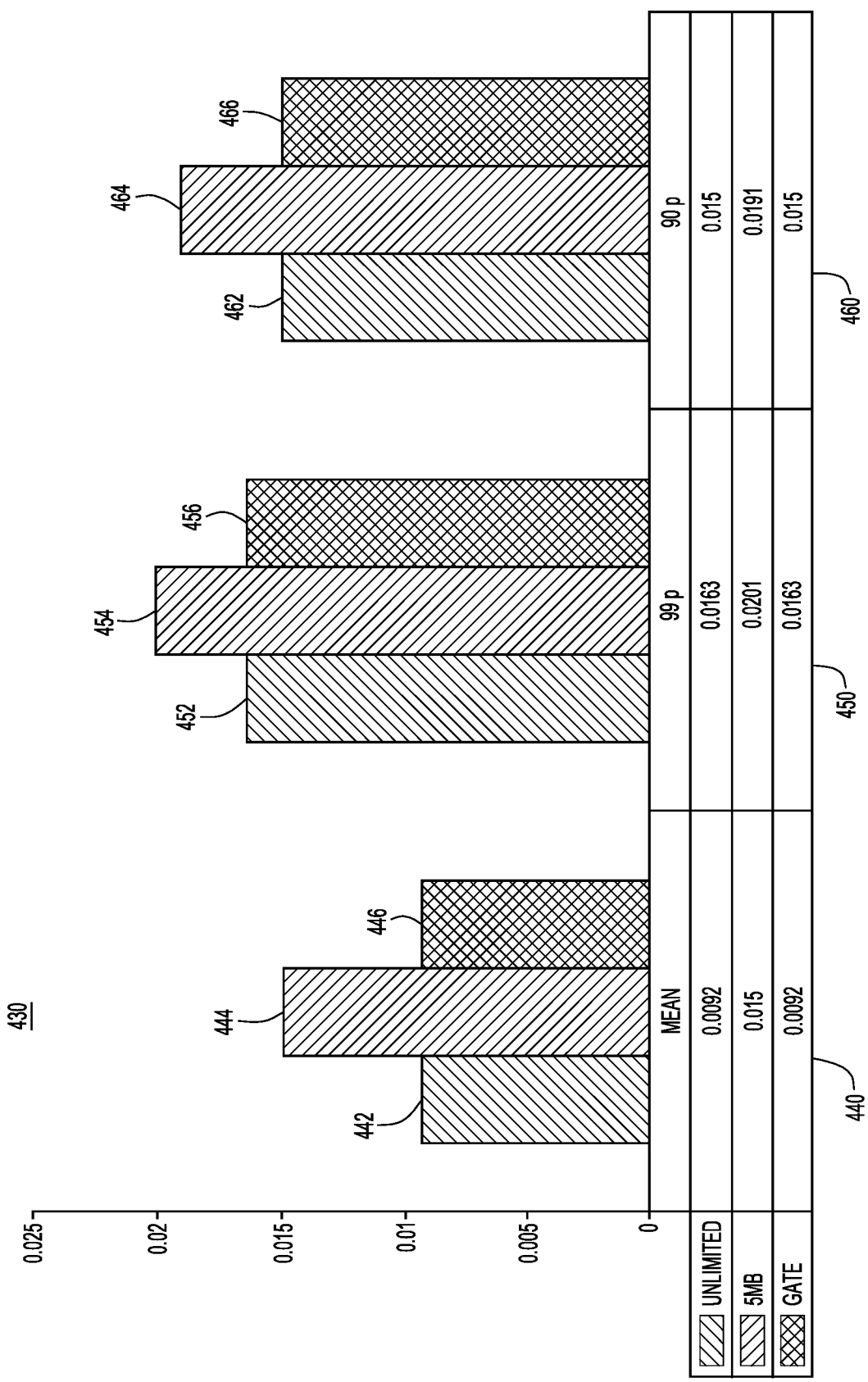
FIG. 4C is a graph of the time to complete a simulated incast event, according to an example embodiment.

Referring now to FIG. 4A, FIG. 4B, and FIG. 4C, a network element (e.g., network element 120) is characterized for simulated incast events under three different buffer conditions. The simulated incast event characterized in FIGS. 4A-4C corresponds to the system described in FIG. 3 in which both packets 310 and packets 320 are incast packets sent in response to a request from incast server 122. Each of the simulated incast events includes an incast server requesting data from 1500 other servers. Each of the other servers respond with a chunk of data (e.g., packets 310, 320) of uniform size between 5 kilobytes (KB) and 50 KB of data. In other words, the network element attached to the incast server receives 1500 responses of a relatively small, uniform size. For clarity, FIG. 4A and FIG. 4B only show ten incast events separated by 0.05 seconds, but the statistics in FIG. 4C includes data from 1000 simulated incast events. The simulations are run with three separate buffer conditions to better illustrate the advantages of the GATE techniques described herein. In addition to a network element employing the GATE buffer techniques, the simulations depicted in FIGS. 4A-4C include a network element with a 5 megabyte (MB) buffer and a network element with an unlimited buffer.

Referring specifically to FIG. 4A, a graph 410 illustrates the queue depth of the egress buffer as each simulated incast event is handled. The simulated network element with the GATE logic is shown with line 412. The simulated network element with a 5 MB buffer is shown with line 414. The simulated network element with an unlimited buffer is shown with line 416. Notably, line 412 shows that the GATE logic allows the simulated network element to complete the incast events at least as fast, if not faster than the network elements represented by lines 414 and 416. Additionally, the maximum queue length depicted by the line 412 is far lower than the maximum queue length depicted by lines 414 or 416. In other words, the GATE logic typically enables the simulated network element to complete the incast event faster and with fewer memory resources allocated to the egress buffer than either of the alternative methods.

Referring specifically now to FIG. 4B, a graph 420 illustrates the queue depth of the ACK buffer associated with the GATE-enabled network element as each simulated incast event is handled. As shown by the line 422, the ACK buffer is able to hold the maximum queue depth due to the incast events with less than 1.8 MB of memory.

Referring specifically now to FIG. 4C, a graph 430 shows statistics on the amount of time that each simulated network element requires to complete an incast event. The graph 430 includes data for the mean time to complete a simulated incast event in column 440. The network element with an unlimited buffer took an average of 0.0092 seconds to complete the simulated incasts, as shown in column 442. The network element with a 5 MB buffer took an average of 0.015 seconds to complete the simulated incasts, as shown in column 444. The network element with the GATE logic took an average of 0.0092 seconds to complete the simulated incasts, as shown in column 446. The GATE-enabled network element equaled the network element with an unlimited buffer, and outperformed the network element with a 5 MB buffer.

In addition to the mean time to complete an incast event, the graph 430 shows the time needed to complete 99% of the incast events in column 450. The network element with an unlimited buffer required no more than 0.0163 seconds to complete 99% of the simulated incasts, as shown in column 452. The network element with a 5 MB buffer required no more than 0.0201 seconds to complete 99% of the simulated incasts, as shown in column 454. The network element with the GATE logic required no more than 0.0163 seconds to complete 99% of the simulated incasts, as shown in column 456. The GATE-enabled network element again equaled the network element with an unlimited buffer, and outperformed the network element with a 5 MB buffer.

Further, the graph 430 shows the time needed to complete 90% of the incast events in column 460. The network element with an unlimited buffer required no more than 0.015 seconds to complete 90% of the simulated incasts, as shown in column 462. The network element with a 5 MB buffer required no more than 0.0191 seconds to complete 90% of the simulated incasts, as shown in column 464. The network element with the GATE logic required no more than 0.015 seconds to complete 90% of the simulated incasts, as shown in column 466. The GATE-enabled network element still equaled the network element with an unlimited buffer, and outperformed the network element with a 5 MB buffer.

Figure 5:
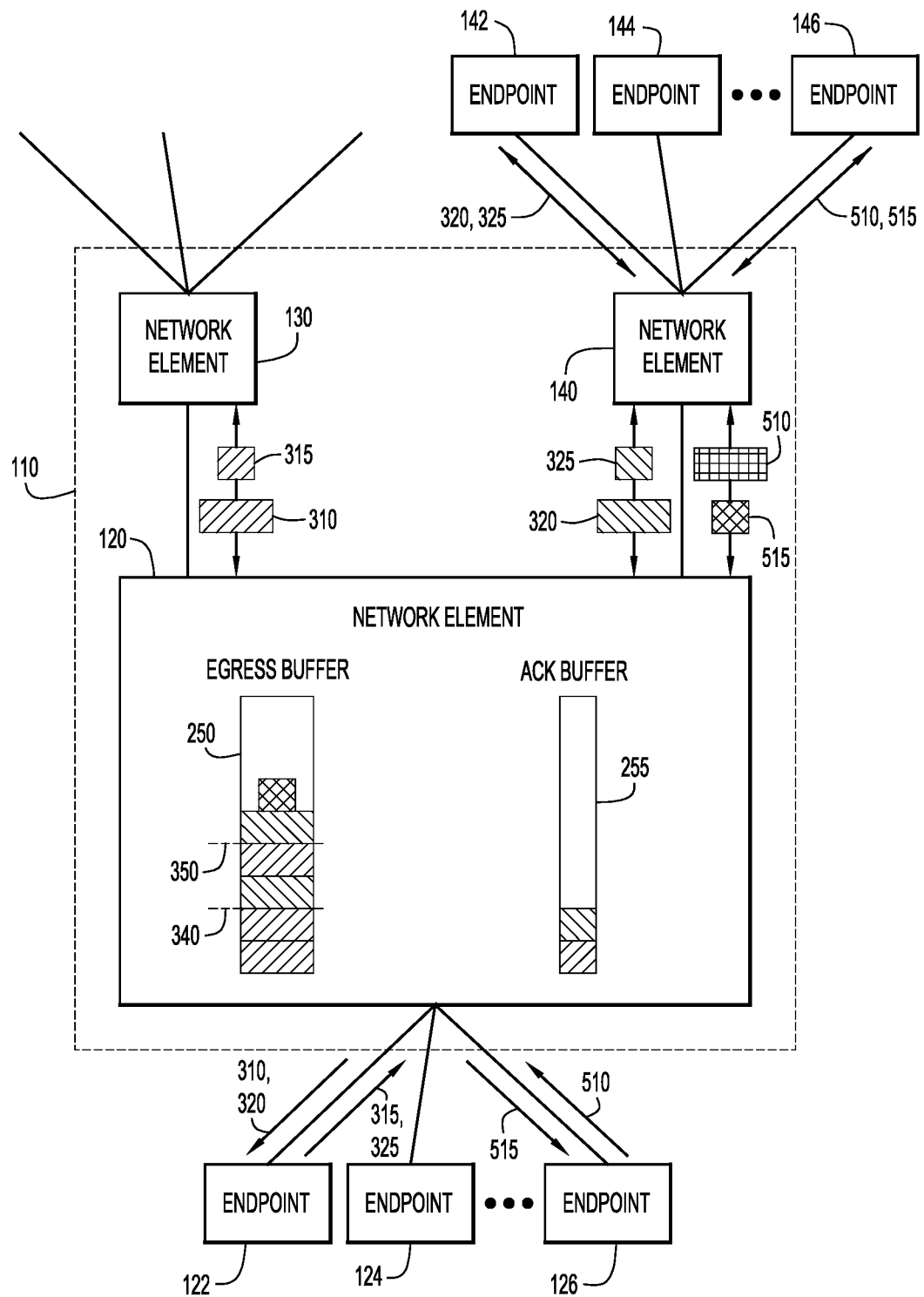
FIG. 5 illustrates handling an incast event along with reverse traffic from a different endpoint than the incast destination, according to an example embodiment.

Referring now to FIG. 5, a simplified block diagram expands on FIG. 3 to illustrate the GATE-enabled network element 120 handling reverse traffic along with the forward traffic and incast events. In addition to the forward traffic (or incast) data packets 310 and 320, and the respective ACK packets 315 and 325, the network element 120 also receives reverse traffic data packets 510 from the endpoint 126 directed to the endpoint 146 behind network element 140. The endpoint 146 sends the ACK packet 515 to the network element 140, which forwards the ACK packet 515 to the network element 120, and the ACK packet 515 gets buffered in the egress buffer 250. In one example, the reverse traffic data packet 510 may be buffered in an egress buffer (not pictured) for packets directed to network element 140. However, for clarity, FIG. 5 only shows the egress buffer 250, which stores packets headed toward the endpoints 122, 124, 126, including the data packets 310, 320, and the ACK packets 515. The reverse traffic data packets 510 may be affected by an incast event that overwhelms the egress buffer 250, since the ACK packets 515 are stored in the same egress buffer 250 as the incast packets.

Figure 6A:
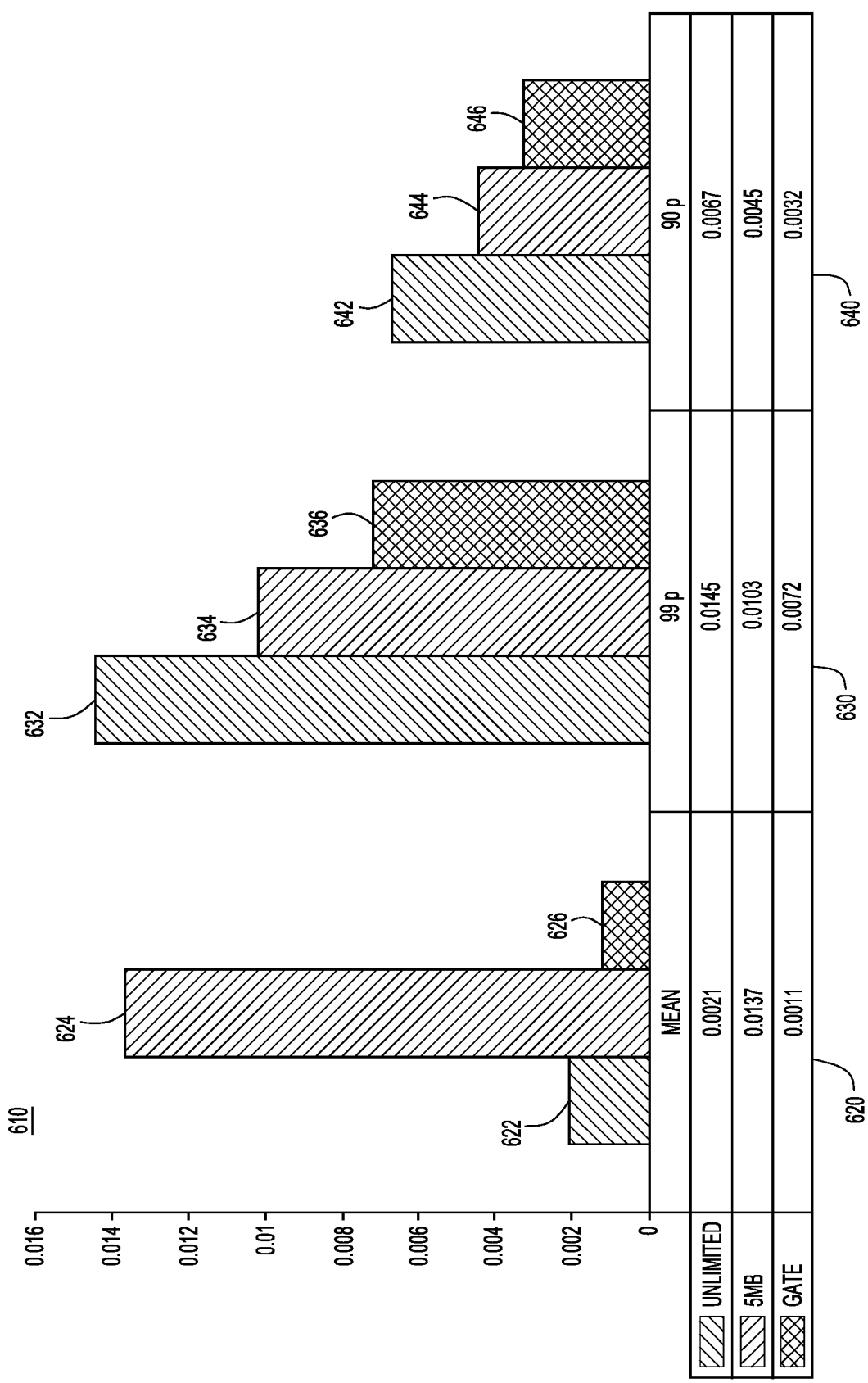
FIG. 6A is a graph of the time to complete reverse traffic flows in a simulated incast event along with reverse traffic from a different endpoint than the incast destination, according to an example embodiment.
Figure 6B:
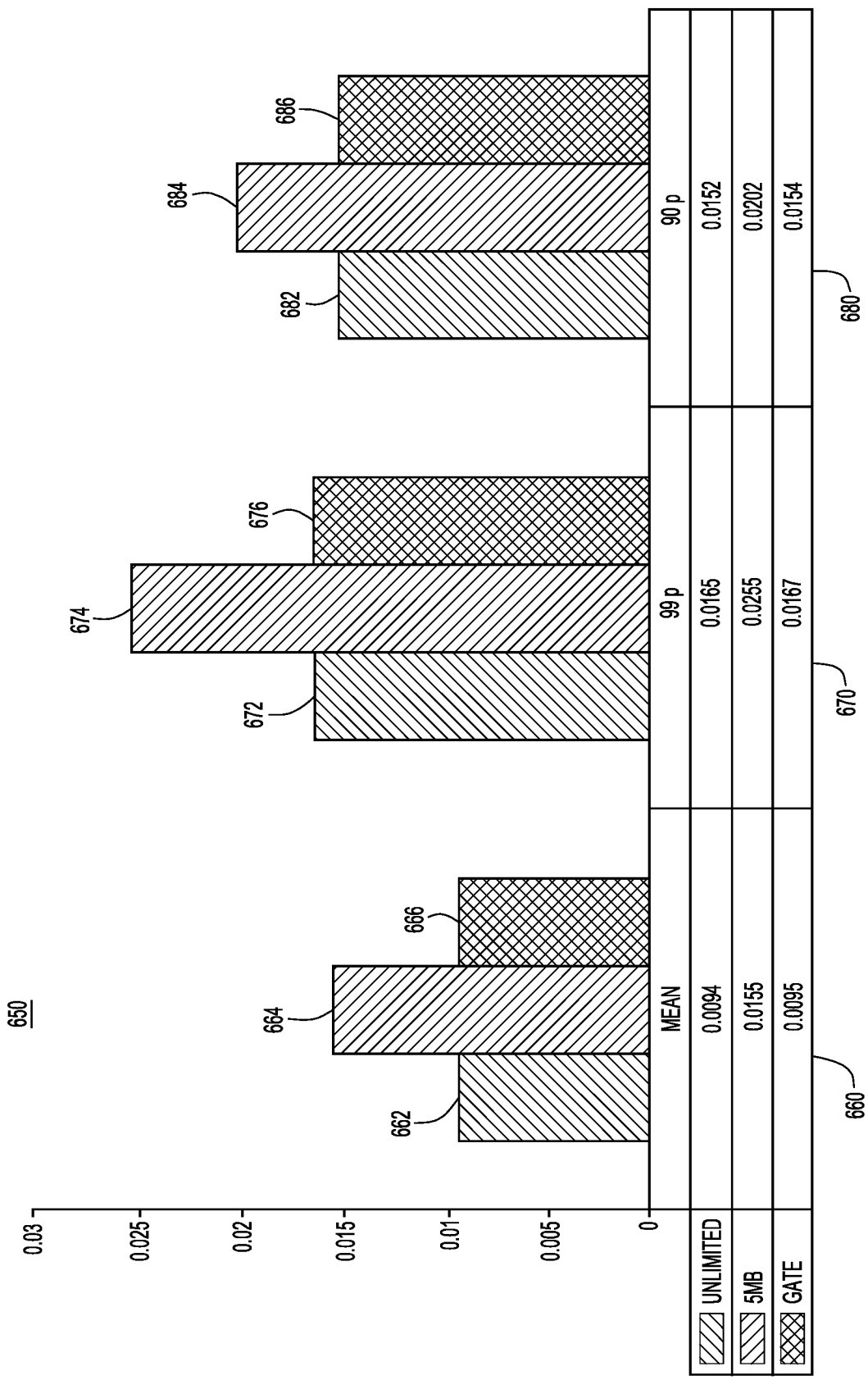
FIG. 6B is a graph of the time to complete the incast traffic in a simulated incast event along with reverse traffic from a different endpoint than the incast destination, according to an example embodiment.

Referring now to FIG. 6A and FIG. 6B, a network element (e.g., network element 120) is characterized for handling reverse traffic during simulated incast events under the same three different buffer conditions as the simulation described with respect to FIGS. 4A-4C. In addition to the 1500 servers sending incast data, the simulated network element must handle ACK packets from reverse traffic consisting of 30% load Data Center TCP (DCTCP) in 10,000 flows from servers other than the incast server. In this simulation, a significant number of the ACK packets for the reverse traffic are being dropped, which affects the completion of the reverse traffic.

Referring specifically now to FIG. 6A, a graph 610 shows statistics on the amount of time that each simulated network element requires to complete the reverse traffic during a simulated incast event. The graph 610 includes data for the mean time to complete the reverse traffic in column 620. The network element with an unlimited buffer took an average of 0.0021 seconds to complete the reverse traffic, as shown in column 622. The network element with a 5 MB buffer took an average of 0.0137 seconds to complete the reverse traffic, as shown in column 624. The network element with the GATE logic took an average of 0.0011 seconds to complete the reverse traffic, as shown in column 626. The GATE-enabled network element outperformed both the network element with an unlimited buffer and the network element with a 5 MB buffer.

In addition to the mean time to complete an incast event, the graph 610 shows the time needed to complete the reverse traffic in 99% of the incast events in column 630. The network element with an unlimited buffer required no more than 0.0145 seconds to complete the reverse traffic in 99% of the simulated incasts, as shown in column 632. The network element with a 5 MB buffer required no more than 0.0103 seconds to complete the reverse traffic in 99% of the simulated incasts, as shown in column 634. The network element with the GATE logic required no more than 0.072 seconds to complete the reverse traffic in 99% of the simulated incasts, as shown in column 636. The GATE-enabled network element again outperformed both the network element with an unlimited buffer and the network element with a 5 MB buffer.

Further, the graph 610 shows the time needed to complete the reverse traffic in 90% of the incast events in column 640. The network element with an unlimited buffer required no more than 0.0067 seconds to complete the reverse traffic in 90% of the simulated incasts, as shown in column 642. The network element with a 5 MB buffer required no more than 0.0045 seconds to complete the reverse traffic in 90% of the simulated incasts, as shown in column 644. The network element with the GATE logic required no more than 0.0032 seconds to complete the reverse traffic in 90% of the simulated incasts, as shown in column 646. The GATE-enabled network element still outperformed both the network element with an unlimited buffer and the network element with a 5 MB buffer.

Referring specifically now to FIG. 6B, a graph 650 shows statistics on the amount of time that each simulated network element requires to complete an incast event. The graph 650 includes data for the mean time to complete a simulated incast event in column 660. The network element with an unlimited buffer took an average of 0.0094 seconds to complete the simulated incasts, as shown in column 662. The network element with a 5 MB buffer took an average of 0.0155 seconds to complete the simulated incasts, as shown in column 664. The network element with the GATE logic took an average of 0.0095 seconds to complete the simulated incasts, as shown in column 666. The GATE-enabled network element nearly equaled the network element with an unlimited buffer, and outperformed the network element with a 5 MB buffer.

In addition to the mean time to complete an incast event, the graph 650 shows the time needed to complete 99% of the incast events in column 670. The network element with an unlimited buffer required no more than 0.0165 seconds to complete 99% of the simulated incasts, as shown in column 672. The network element with a 5 MB buffer required no more than 0.0255 seconds to complete 99% of the simulated incasts, as shown in column 674. The network element with the GATE logic required no more than 0.0167 seconds to complete 99% of the simulated incasts, as shown in column 676. The GATE-enabled network element again nearly equaled the network element with an unlimited buffer, and outperformed the network element with a 5 MB buffer.

Further, the graph 650 shows the time needed to complete 90% of the incast events in column 680. The network element with an unlimited buffer required no more than 0.0152 seconds to complete 90% of the simulated incasts, as shown in column 682. The network element with a 5 MB buffer required no more than 0.0202 seconds to complete 90% of the simulated incasts, as shown in column 684. The network element with the GATE logic required no more than 0.0154 seconds to complete 90% of the simulated incasts, as shown in column 686. The GATE-enabled network element still nearly equaled the network element with an unlimited buffer, and outperformed the network element with a 5 MB buffer.

Figure 7:
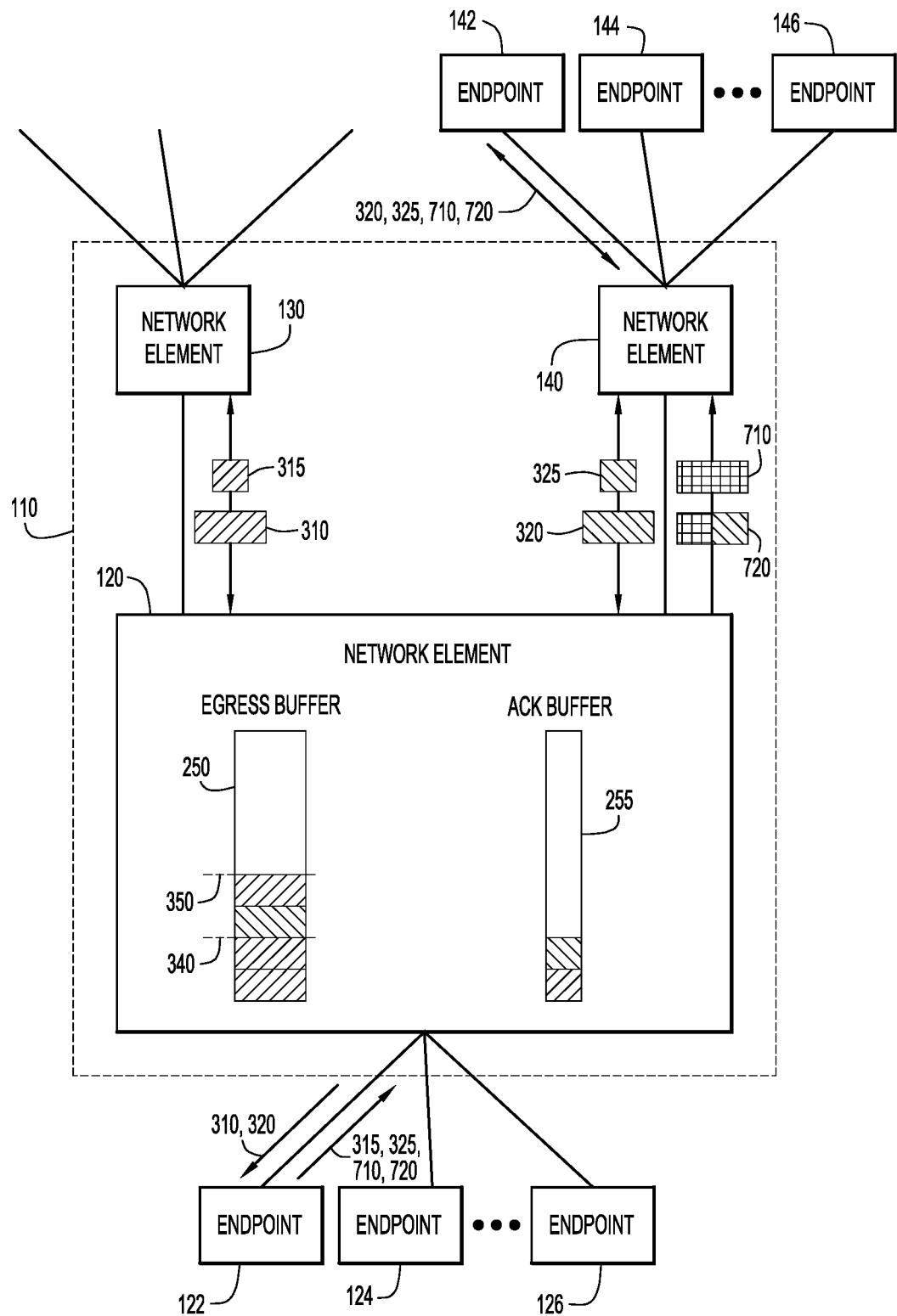
FIG. 7 illustrates handling an incast event along with reverse traffic from the incast destination, according to an example embodiment.

Referring now to FIG. 7, a simplified block diagram expands on FIG. 3 to illustrate the GATE-enabled network element 120 handling ACK packets that are piggybacked on reverse traffic. In contrast to the system described with respect to FIG. 5, the network element 120 receives reverse traffic data packets 710 from the same endpoint 122 to which the incast data is directed, and the reverse traffic is directed to an endpoint 142 that is sending an incast packet (e.g., packet 320). Instead of sending the separate ACK packet 325 to the acknowledge the data packet 320, the endpoint 122 may generate a new packet 720 that piggybacks the ACK packet 325 on reverse traffic data packet 710 that is directed to the endpoint 142. Since the ACK buffer 255 only captures pure ACK packets (e.g., ACK packets 315 and 325), but not data packets (e.g., reverse traffic data packet 710), the acknowledgement that is piggybacked on reverse traffic data packet 720 reaches the endpoint 142. The acknowledgement to data packet 320 that is piggybacked on reverse packet 720 allows the endpoint 142 to send additional data packets 320, which will enter the egress buffer 250 of the network element 120. In this way, piggybacking acknowledgements on reverse traffic data packets bypasses the ACK buffer 255, but the rate of the data packets 320 are still controlled by the network element 120 since the subsequent round of data packet(s) 320 are captured in the egress buffer 250.

In other words, since data packets are flowing in both directions between the incast server 122 and the endpoint 142, ACK packets for data packets in one direction may be piggybacked on data packets in the reverse direction. To avoid unnecessary queueing latency for data packets in the reverse direction, the network element 120 only buffers pure ACK packets in the ACK buffer 255, and not piggybacked ACK packets. For piggybacked ACK packets, the transmission of the ACK is paced down on the endpoints, since the endpoints waits for the next data packet in the reverse direction.

Figure 8A:
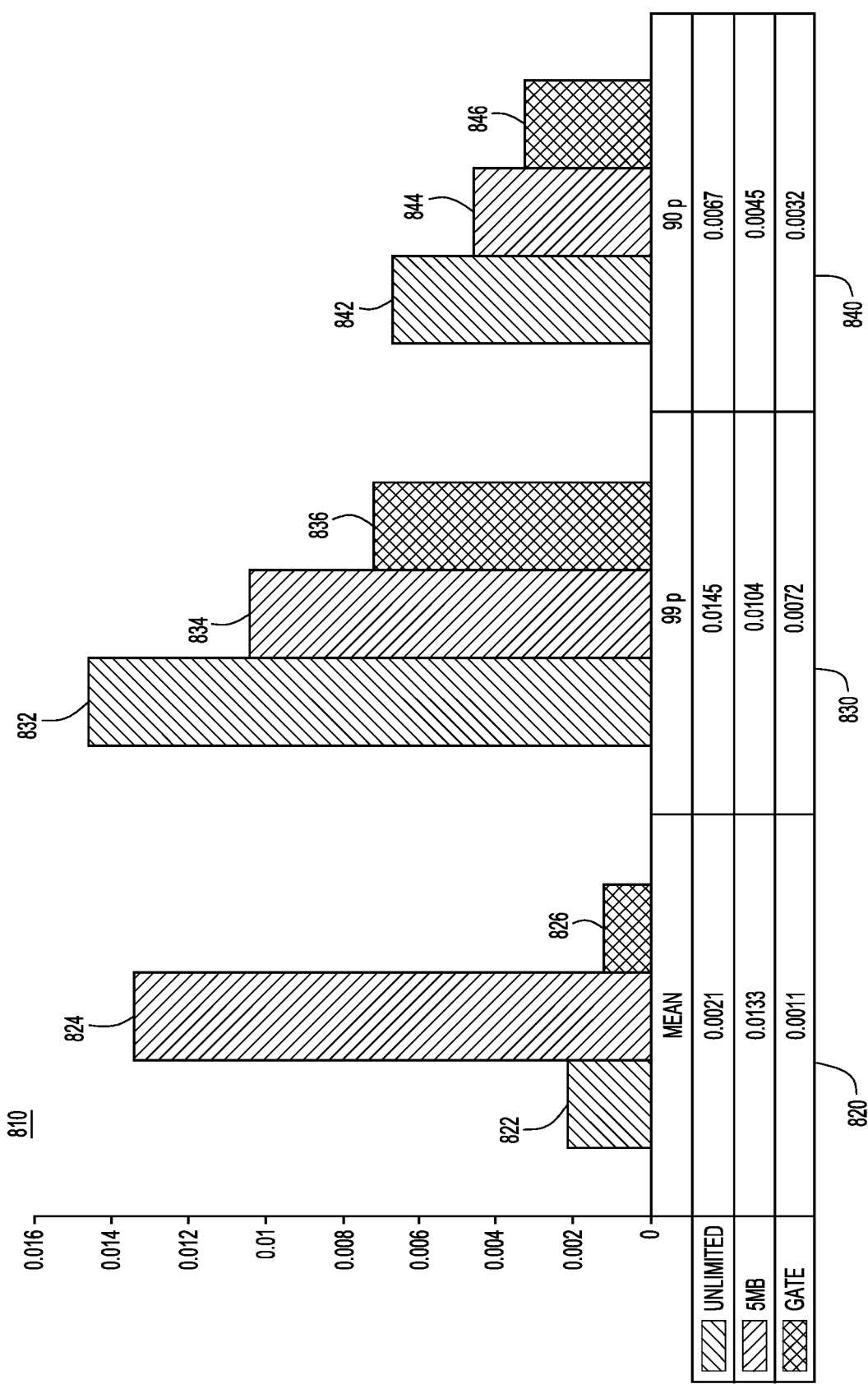
FIG. 8A is a graph of the time to complete the reverse traffic flows in a simulated incast event along with reverse traffic from the incast destination, according to an example embodiment.
Figure 8B:
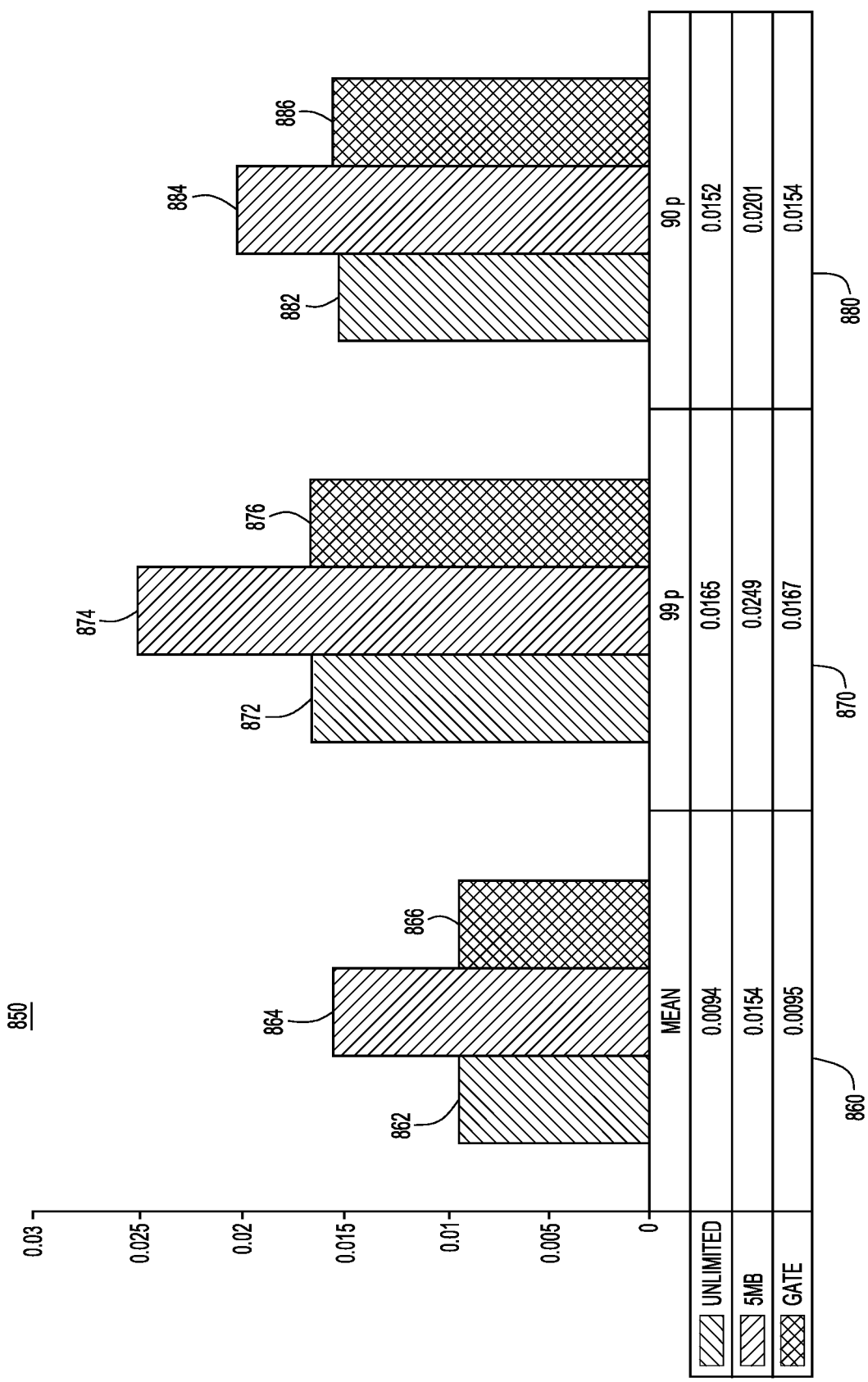
FIG. 8B is a graph of the time to complete the incast traffic in a simulated incast event along with reverse traffic from the incast destination, according to an example embodiment.

Referring now to FIG. 8A and FIG. 8B, a network element (e.g., network element 120) is characterized for handling reverse traffic during simulated incast events under the same three different buffer conditions as the simulation described with respect to FIGS. 4A-4C. In addition to the 1500 servers sending incast data, the simulated network element must handle piggybacked ACK packets from reverse traffic consisting of 30% load Data Center TCP (DCTCP) in 10,000 flows from servers other than the incast server. In this simulation, a significant number of the ACK packets for the reverse traffic are being dropped, which affects the completion of the reverse traffic.

Referring specifically now to FIG. 8A, a graph 810 shows statistics on the amount of time that each simulated network element requires to complete the reverse traffic during a simulated incast event. The graph 810 includes data for the mean time to complete the reverse traffic in column 820. The network element with an unlimited buffer took an average of 0.0021 seconds to complete the reverse traffic, as shown in column 822. The network element with a 5 MB buffer took an average of 0.0133 seconds to complete the reverse traffic, as shown in column 824. The network element with the GATE logic took an average of 0.0011 seconds to complete the reverse traffic, as shown in column 826. The GATE-enabled network element outperformed both the network element with an unlimited buffer and the network element with a 5 MB buffer.

In addition to the mean time to complete an incast event, the graph 810 shows the time needed to complete the reverse traffic in 99% of the incast events in column 830. The network element with an unlimited buffer required no more than 0.0145 seconds to complete the reverse traffic in 99% of the simulated incasts, as shown in column 832. The network element with a 5 MB buffer required no more than 0.0104 seconds to complete the reverse traffic in 99% of the simulated incasts, as shown in column 834. The network element with the GATE logic required no more than 0.072 seconds to complete the reverse traffic in 99% of the simulated incasts, as shown in column 836. The GATE-enabled network element again outperformed both the network element with an unlimited buffer and the network element with a 5 MB buffer.

Further, the graph 810 shows the time needed to complete the reverse traffic in 90% of the incast events in column 840. The network element with an unlimited buffer required no more than 0.0067 seconds to complete the reverse traffic in 90% of the simulated incasts, as shown in column 842. The network element with a 5 MB buffer required no more than 0.0045 seconds to complete the reverse traffic in 90% of the simulated incasts, as shown in column 844. The network element with the GATE logic required no more than 0.0032 seconds to complete the reverse traffic in 90% of the simulated incasts, as shown in column 846. The GATE-enabled network element still outperformed both the network element with an unlimited buffer and the network element with a 5 MB buffer.

Referring specifically now to FIG. 8B, a graph 850 shows statistics on the amount of time that each simulated network element requires to complete an incast event. The graph 850 includes data for the mean time to complete a simulated incast event in column 860. The network element with an unlimited buffer took an average of 0.0094 seconds to complete the simulated incasts, as shown in column 862. The network element with a 5 MB buffer took an average of 0.0154 seconds to complete the simulated incasts, as shown in column 864. The network element with the GATE logic took an average of 0.0095 seconds to complete the simulated incasts, as shown in column 866. The GATE-enabled network element nearly equaled the network element with an unlimited buffer, and outperformed the network element with a 5 MB buffer.

In addition to the mean time to complete an incast event, the graph 850 shows the time needed to complete 99% of the incast events in column 870. The network element with an unlimited buffer required no more than 0.0165 seconds to complete 99% of the simulated incasts, as shown in column 872. The network element with a 5 MB buffer required no more than 0.0249 seconds to complete 99% of the simulated incasts, as shown in column 874. The network element with the GATE logic required no more than 0.0167 seconds to complete 99% of the simulated incasts, as shown in column 876. The GATE-enabled network element again nearly equaled the network element with an unlimited buffer, and outperformed the network element with a 5 MB buffer.

Further, the graph 850 shows the time needed to complete 90% of the incast events in column 880. The network element with an unlimited buffer required no more than 0.0152 seconds to complete 90% of the simulated incasts, as shown in column 882. The network element with a 5 MB buffer required no more than 0.0201 seconds to complete 90% of the simulated incasts, as shown in column 884. The network element with the GATE logic required no more than 0.0154 seconds to complete 90% of the simulated incasts, as shown in column 886. The GATE-enabled network element still nearly equaled the network element with an unlimited buffer, and outperformed the network element with a 5 MB buffer.

Figure 9:
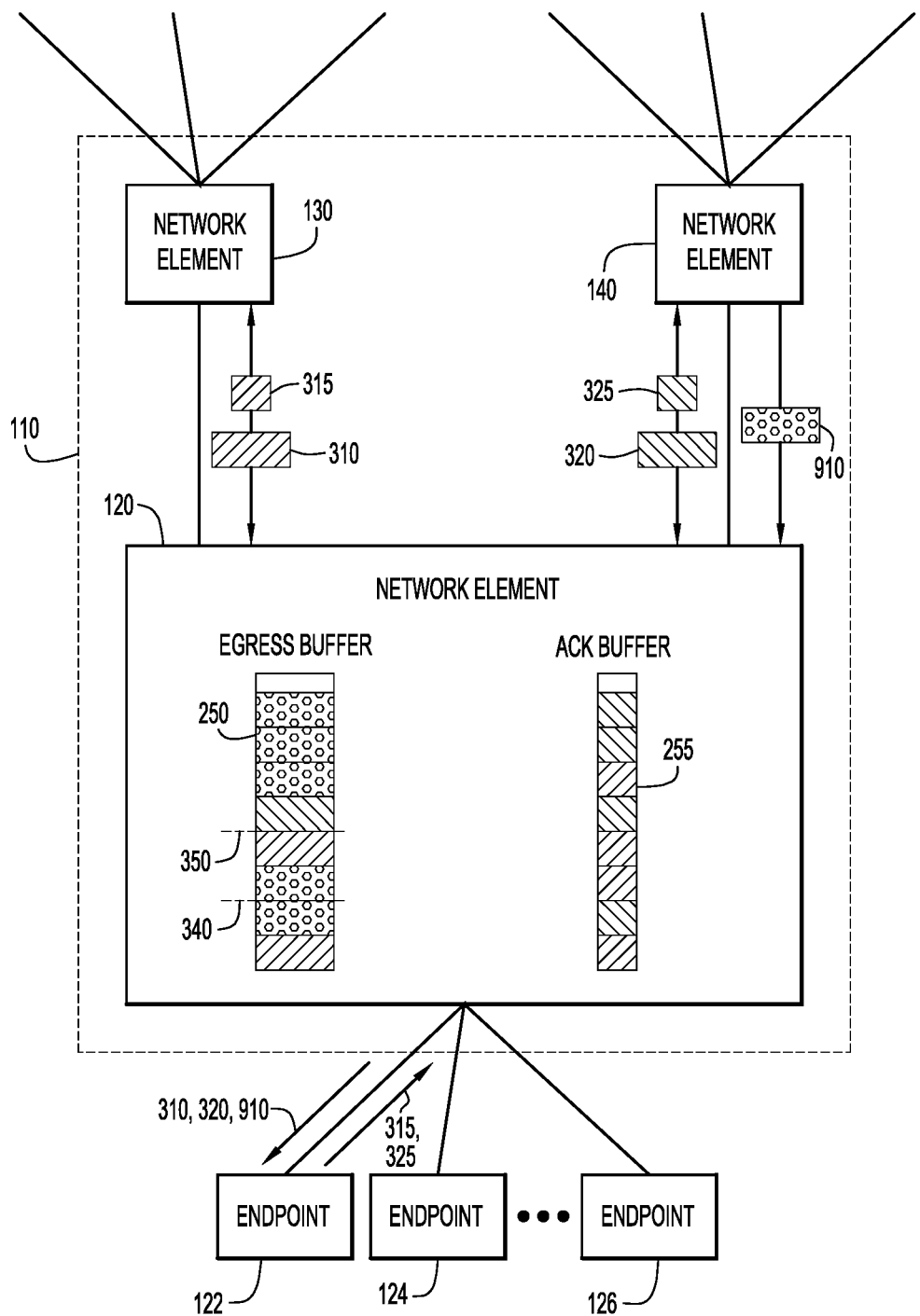
FIG. 9 illustrates handling an incast event along with bursty, unacknowledged data traffic, according to an example embodiment.

Referring now to FIG. 9, a simplified block diagram expands on FIG. 3 to illustrate the GATE-enabled network element 120 handling bursty User Datagram Protocol (UDP) traffic along with the forward traffic and incast events. In addition to the data packets 310 and 320, the network element periodically receives a high volume of UDP packets 910. When the UDP packets 910 fill the egress buffer 250, the release rate from the ACK buffer 255 essentially drops to zero, effectively halting the TCP flows (e.g., packets 310 and/or 320) from being sent to the network element 120. Since the TCP flows are halted, the network element 120 only drops UDP packets 910 from the egress buffer 250 until the UDP burst is finished, and the egress buffer queue depth lowers to the point that ACK packets from the ACK buffer 255 are released again.

Figure 10:
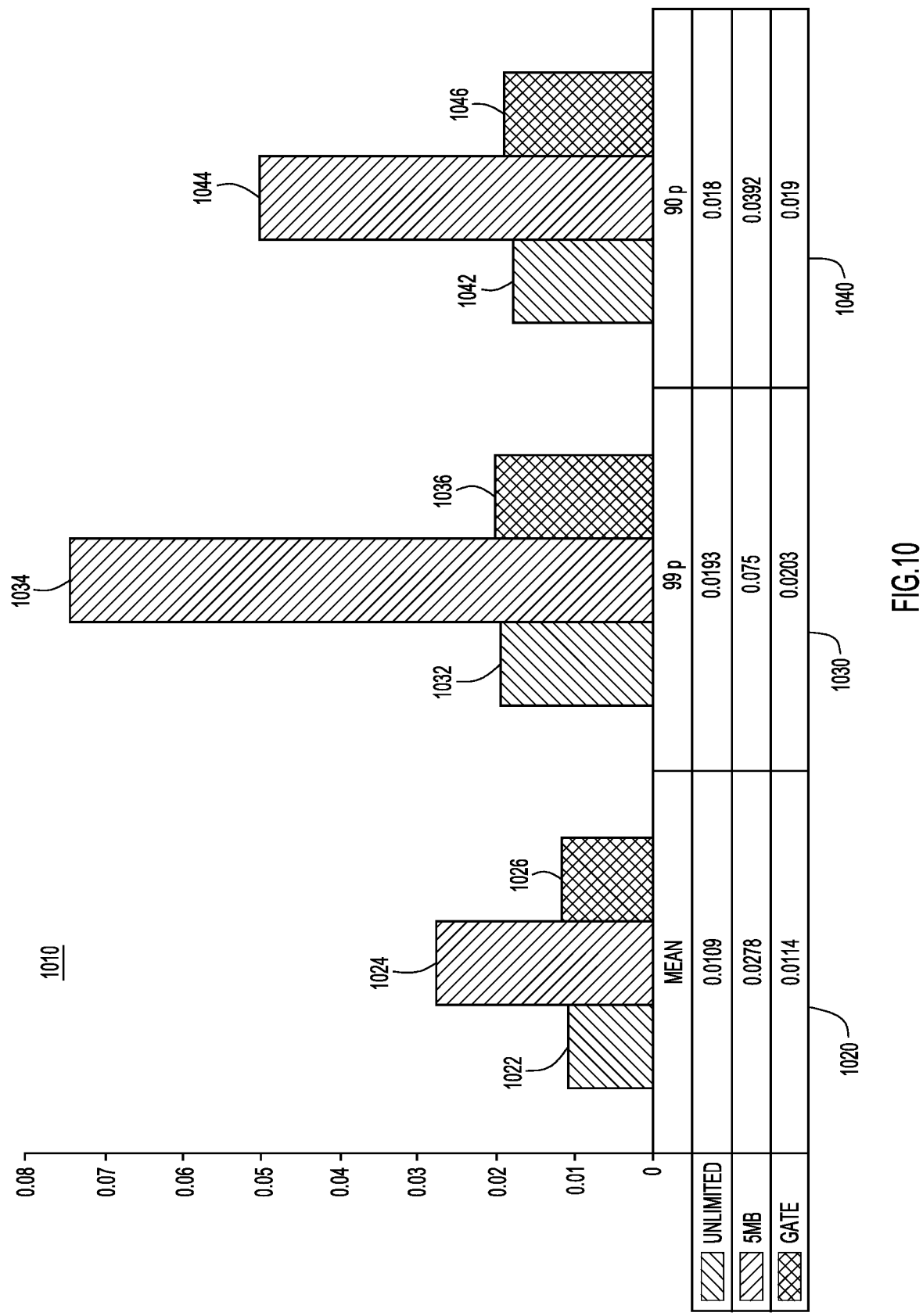
FIG. 10 is a graph of the time to complete the incast traffic in a simulated incast event along with bursty, unacknowledged data traffic, according to an example embodiment.

Referring now to FIG. 10, a network element (e.g., network element 120) is characterized for handling bursty UDP traffic during simulated incast events under the same three different buffer conditions as the simulation described with respect to FIGS. 4A-4C. In addition to the 1500 servers sending incast data, the simulated network element must handle 1 millisecond bursts of 40 gigabyte (GB) per second UDP traffic every 5 milliseconds. Essentially, the incast traffic shuts down during the UDP bursts, and resumes in the 4 millisecond interval in which there is no UDP traffic.

A graph 1010 of FIG. 10 shows statistics on the amount of time that each simulated network element requires to complete an incast event. The graph 1010 includes data for the mean time to complete a simulated incast event in column 1020. The network element with an unlimited buffer took an average of 0.0109 seconds to complete the simulated incasts, as shown in column 1022. The network element with a 5 MB buffer took an average of 0.0278 seconds to complete the simulated incasts, as shown in column 1024. The network element with the GATE logic took an average of 0.0114 seconds to complete the simulated incasts, as shown in column 1026. The GATE-enabled network element nearly equaled the network element with an unlimited buffer, and outperformed the network element with a 5 MB buffer.

In addition to the mean time to complete an incast event, the graph 1010 shows the time needed to complete 99% of the incast events in column 1030. The network element with an unlimited buffer required no more than 0.0193 seconds to complete 99% of the simulated incasts, as shown in column 1032. The network element with a 5 MB buffer required no more than 0.075 seconds to complete 99% of the simulated incasts, as shown in column 1034. The network element with the GATE logic required no more than 0.0203 seconds to complete 99% of the simulated incasts, as shown in column 1036. The GATE-enabled network element again nearly equaled the network element with an unlimited buffer, and outperformed the network element with a 5 MB buffer.

Further, the graph 1010 shows the time needed to complete 90% of the incast events in column 1040. The network element with an unlimited buffer required no more than 0.018 seconds to complete 90% of the simulated incasts, as shown in column 1042. The network element with a 5 MB buffer required no more than 0.0392 seconds to complete 90% of the simulated incasts, as shown in column 1044. The network element with the GATE logic required no more than 0.019 seconds to complete 90% of the simulated incasts, as shown in column 1046. The GATE-enabled network element still nearly equaled the network element with an unlimited buffer, and outperformed the network element with a 5 MB buffer.

As seen by the statistics of the simulated incast events shown in FIGS. 4A-4C, 6A, 6B, 8A, 8B, and 10, the GATE logic enables a network element to function at least as well as a network element with an unlimited buffer. However, the total buffer memory required is significantly less with a GATE-enabled network element, since ACK packets are significantly smaller than data packets. Additionally, the GATE logic avoids the tail drop on the egress path for mission critical traffic. In other words, the GATE logic prevents mission critical traffic from even being sent to the network device when it would be dropped due to a buffer overflow. Further, the GATE logic reduces latency on the egress path of the network element.

Figure 11:
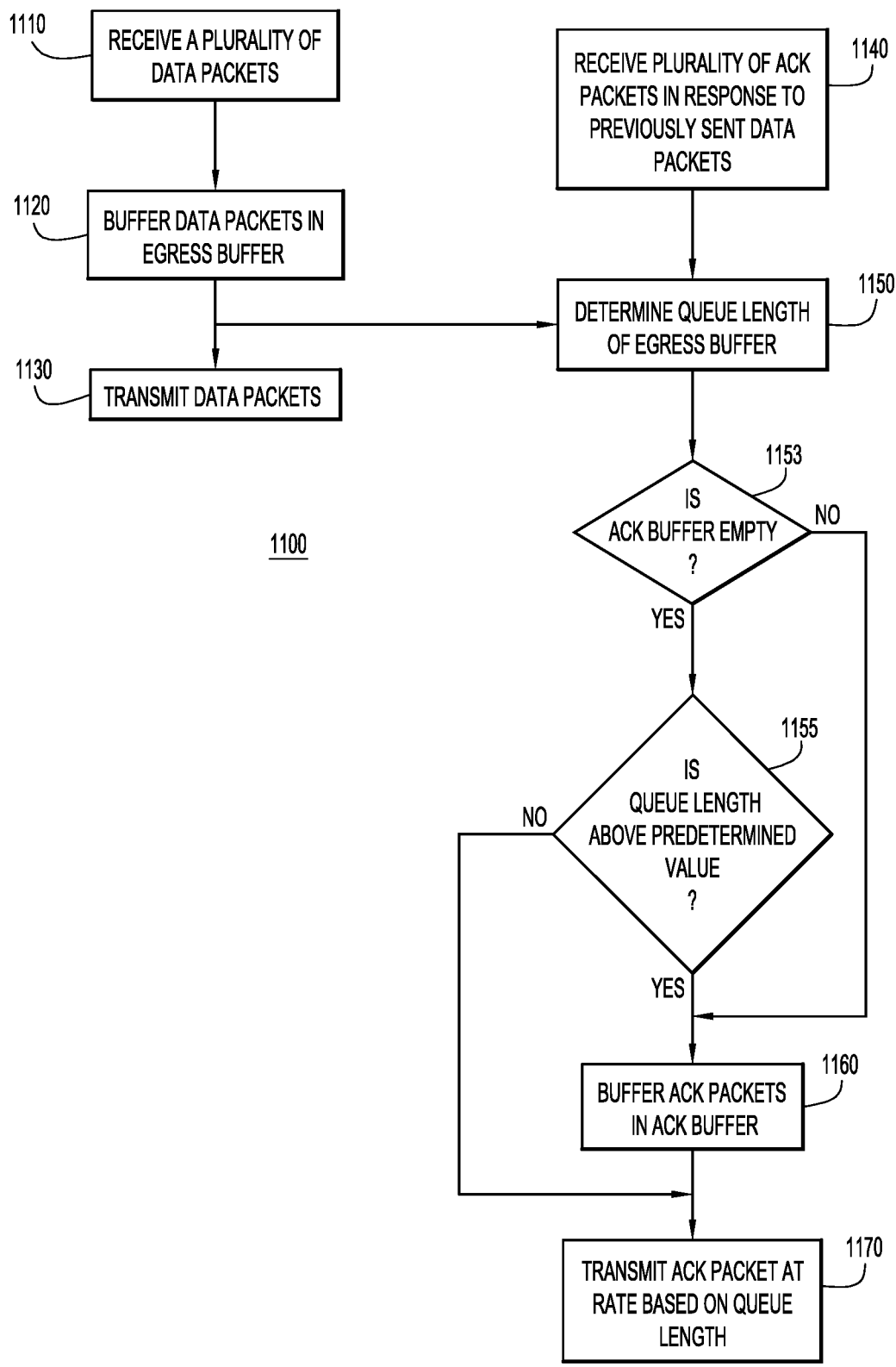
FIG. 11 is a flowchart depicting operations of a network element buffering acknowledgement message to manage the queue length of the data traffic buffer, according to an example embodiment.

Referring now to FIG. 11, a flowchart illustrates a process 1100 by a network device (e.g., network element 120) in controlling the rate at which the network device receives data packets by adjusting the rate at which the network device transmits ACK packets. In step 1110, the network device receives a plurality of data packets from one or more endpoints. The network device buffers the plurality of data packets in an egress buffer at step 1120. In one example, the plurality of data packets may include incast packets, data packets from long-lived TCP flows, and/or UDP packets. In step 1130, the network device transmits the plurality of data packets.

In step 1140, the network device receives a plurality of acknowledgement packets that are sent in response to data packets previously transmitted by the network device. In one example, the acknowledgement packets may be ACK packets corresponding to long-lived TCP flows or ACK packets corresponding to incast packets. In step 1150, the network device determines the queue length of the egress buffer. If an acknowledgement buffer of the network device is not empty, as determined in step 1153, then the network device buffers the plurality of acknowledgement packets in the acknowledgement buffer in step 1160. If the acknowledgement buffer is empty, as determined in step 1153, then the network device compares the queue length to a predetermined value at step 1155. If the queue length is above the predetermined value, the network device buffers the plurality of acknowledgement packets in the acknowledgement buffer in step 1160 and then transmits the acknowledgement packets at an acknowledgement rate that is based on the queue length of the egress buffer in step 1170. If the queue length is below the predetermined value and the acknowledgement buffer is empty, then the network device bypasses the acknowledgement buffer and transmits the acknowledgment packets in step 1170.

In summary, a network element using the techniques presented herein effectively controls the arrival rate of data packets by controlling the rate of the release of buffered ACK packets. Since ACK packets are significantly smaller than most data packets, the total buffer size is significantly reduced on network elements, while maintaining adequate buffer space to handle large incast events.

In one form, a method is provided for a network element to transmit acknowledgement packets according to the length of the egress queue. The method comprises receiving a plurality of data packets from one or more endpoints and buffering the plurality of data packets in an egress buffer before transmitting the plurality of data packets. The method also includes receiving a plurality of acknowledgement packets that are sent in response to data packets previously transmitted by the network device. The plurality of acknowledgement packets are buffered in an acknowledgement buffer. The method further includes transmitting the plurality of acknowledgement packets at an acknowledgment rate that is based on a queue length of the egress buffer.

In another form, an apparatus is provided comprising a network interface unit, an egress buffer, an acknowledgement buffer, and a processor. The network interface unit is configured to receive a plurality of data packets from one or more endpoints, transmit the plurality of data packets, and receive a plurality of acknowledgment packets that are sent in response to data packets previously transmitted by the apparatus. The processor is configured to store the plurality of data packets in the egress buffer and store the plurality of acknowledgement packets in the acknowledgement buffer. The processor is also configured to cause the network interface to transmit the plurality of acknowledgement packets from the acknowledgement buffer at an acknowledgment rate that is based on a queue length of the egress buffer.

In still another form, one or more non-transitory computer readable storage media is encoded with software comprising computer executable instructions and, when the software is executed by a processor on a first network device, operable to cause the processor to receive a plurality of data packets from one or more endpoints, buffer the plurality of data packets in an egress buffer, and transmit the plurality of data packets. The instructions also cause the processor to receive a plurality of acknowledgment packets that are sent in response to data packets previously transmitted by the network device and buffer the plurality of acknowledgement packets in an acknowledgement buffer. The instructions further cause the processor to transmit the plurality of acknowledgement packets at an acknowledgement rate that is based on a queue length of the egress buffer.

The above description is intended by way of example only. Although the present disclosure has been described in detail with reference to particular arrangements and configurations, these example configurations and arrangements may be changed significantly without departing from the scope of the present disclosure.

What is claimed is:

1. A method comprising:
   at a network device, receiving a plurality of data packets from one or more endpoints;
   buffering the plurality of data packets in an egress buffer;
   receiving a plurality of acknowledgement packets that are sent in response to data packets previously transmitted by the network device;
   transmitting the plurality of data packets;
   buffering the plurality of acknowledgement packets in an acknowledgement buffer;
   transmitting the plurality of acknowledgement packets at an acknowledgement rate that is based on a queue length of the egress buffer; and
   responsive to a determination that the queue length of the egress buffer is below a predetermined threshold, bypassing the acknowledgement buffer and transmitting the plurality of acknowledgement packets.

2. The method of claim 1, wherein the acknowledgement rate is determined according to the queue length of the egress buffer and a rate of change of the queue length of the egress buffer.

3. The method of claim 2, further comprising updating the acknowledgement rate based on an updated determination of the queue length of the egress buffer.

4. The method of claim 1, wherein the acknowledgement rate is further determined according to parameters of a network in which the network device is deployed.

5. The method of claim 1, wherein the plurality of data packets comprise a plurality of forward traffic data packets, the method further comprising:
   receiving one or more reverse traffic data packets sent to the one or more endpoints, wherein at least one of the reverse traffic data packets includes an acknowledgement of at least one of the plurality of forward traffic data packets; and
   transmitting the one or more reverse traffic data packets to the one or more endpoints.

6. The method of claim 1, wherein the egress buffer comprises a plurality of egress buffers and the acknowledgement buffer comprises a plurality of acknowledgement buffers, each of the plurality of acknowledgement buffers corresponding to one of the plurality of egress buffers.

7. The method of claim 6, each of the plurality of acknowledgement buffers releases acknowledgement packets at a corresponding acknowledgement rate that is based on a corresponding queue length of the corresponding egress buffer.

8. The method of claim 1, wherein the acknowledgement rate at which the plurality of acknowledgement packets are transmitted is determined by a control loop that calculates a number of acknowledgement packets to transmit in a configurable time interval.

9. An apparatus comprising:
   a network interface unit configured to:
      receive a plurality of data packets from one or more endpoints;
      transmit the plurality of data packets; and
      receive a plurality of acknowledgement packets that are sent in response to data packets previously transmitted by the apparatus;
   an egress buffer;
   an acknowledgement buffer; and
   a processor configured to:
      store the plurality of data packets in the egress buffer;
      store the plurality of acknowledgement packets in the acknowledgement buffer;
      cause the network interface unit to transmit the plurality of acknowledgement packets from the acknowledgement buffer at an acknowledgement rate that is based on a queue length of the egress buffer; and
      responsive to a determination that the queue length of the egress buffer is below a predetermined threshold, bypass the acknowledgement buffer and cause the network interface unit to transmit the plurality of acknowledgement packets.

10. The apparatus of claim 9, wherein the processor is further configured to:
    determine the acknowledgement rate according to the queue length of the egress buffer and a rate of change of the queue length of the egress buffer; and
    update the acknowledgement rate based on an updated determination of the queue length of the egress buffer.

11. The apparatus of claim 9, wherein the processor is further configured to determine the acknowledgement rate according to parameters of a network in which the apparatus is deployed.

12. The apparatus of claim 9, wherein the egress buffer comprises a plurality of egress buffers and the acknowledgement buffer comprises a plurality of acknowledgement buffers, each of the plurality of acknowledgement buffers corresponding to one of the plurality of egress buffers.

13. The apparatus of claim 12, wherein the processor is configured to release acknowledgement packets from each of the plurality of acknowledgement buffers at a corresponding acknowledgement rate that is based on a corresponding queue length of the corresponding egress buffer.

14. The apparatus of claim 9, wherein the plurality of data packets comprise a plurality of forward traffic data packets, and wherein the network interface unit is further configured to:
  receive one or more reverse traffic data packets sent to the one or more endpoints, wherein at least one of the reverse traffic data packets includes an acknowledgement of at least one of the plurality of forward traffic data packets; and
  transmitting the one or more reverse traffic data packets to the one or more endpoints.

15. One or more non-transitory computer readable storage media encoded with software comprising computer executable instructions and, when the software is executed by a processor on a network device, operable to cause the processor to:
  receive a plurality of data packets from one or more endpoints;
  buffer the plurality of data packets in an egress buffer;
  receive a plurality of acknowledgement packets that are sent in response to data packets previously transmitted by the network device;
  transmit the plurality of data packets;
  buffer the plurality of acknowledgement packets in an acknowledgement buffer;
  transmit the plurality of acknowledgement packets at an acknowledgement rate that is based on a queue length of the egress buffer; and
  responsive to a determination that the queue length of the egress buffer is below a predetermined threshold, bypass the acknowledgement buffer and transmit the plurality of acknowledgement packets.

16. The non-transitory computer readable storage media of claim 15, further comprising instructions operable to cause the processor to:
  determine the acknowledgement rate according to the queue length of the egress buffer and a rate of change of the queue length of the egress buffer; and
  update the acknowledgement rate based on an updated determination of the queue length of the egress buffer.

17. The non-transitory computer readable storage media of claim 15, further comprising instructions operable to cause the processor to determine the acknowledgement rate according to parameters of a network in which the network device is deployed.

18. The non-transitory computer readable storage media of claim 15, further comprising instructions operable to cause the processor to store the plurality of data packets in a plurality of egress buffers and store the acknowledgement packets in a plurality of acknowledgement buffers, each of the plurality of acknowledgement buffers corresponding to one of the plurality of egress buffers.

19. The non-transitory computer readable storage media of claim 18, further comprising instructions operable to cause the processor to release acknowledgement packets from each of the plurality of acknowledgement buffers at a corresponding acknowledgement rate that is based on a corresponding queue length of the corresponding egress buffer.

20. The non-transitory computer readable storage media of claim 15, wherein the plurality of data packets comprise a plurality of forward traffic data packets, and further comprising instructions operable to cause the processor to:
  receive one or more reverse traffic data packets sent to the one or more endpoints, wherein at least one of the reverse traffic data packets includes an acknowledgement of at least one of the plurality of forward traffic data packets; and
  transmitting the one or more reverse traffic data packets to the one or more endpoints.

* * * * *